(12) United States Patent
Erickson

(10) Patent No.: US 7,287,941 B1
(45) Date of Patent: Oct. 30, 2007

(54) APPARATUS FOR AMPLIFYING THE PULL BACK FORCE ON A LOCK ROD USED TO SECURE A TOOLHOLDER

(75) Inventor: Robert A. Erickson, Raleigh, NC (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 11/470,051

(22) Filed: Sep. 5, 2006

(51) Int. Cl.
*B23C 5/26* (2006.01)
(52) U.S. Cl. .................... 409/233; 408/239 R
(58) Field of Classification Search ........ 409/231–233; 408/239 R, 239 A
See application file for complete search history.

(56) References Cited

U.S. PATENT DOCUMENTS

| | | | | |
|---|---|---|---|---|
| 3,023,675 | A | * | 3/1962 | Stephan ............... 409/233 |
| 5,613,929 | A | * | 3/1997 | Bayer ............... 409/233 |
| 5,626,448 | A | * | 5/1997 | Huang et al. ............... 409/233 |
| 5,865,578 | A | * | 2/1999 | Benedikter et al. ......... 409/233 |
| 5,980,172 | A | * | 11/1999 | Shoda ............... 409/232 |
| 6,416,450 | B2 | | 7/2002 | Susnjara |
| 7,217,230 | B2 | * | 5/2007 | Hyun ............... 409/233 |
| 2002/0006853 | A1 | | 1/2002 | Susnjara |
| 2006/0239788 | A1 | * | 10/2006 | Hyun ............... 409/233 |

FOREIGN PATENT DOCUMENTS

| | | | | |
|---|---|---|---|---|
| JP | 2000-005907 | A | * | 1/2000 |
| KR | 2003-0072272 | A | * | 9/2003 |
| SU | 961870 | A | * | 9/1982 |
| SU | 16445077 | A1 | * | 4/1991 |

OTHER PUBLICATIONS

English Translation of SU1645077-A1, 2 pages.*

* cited by examiner

*Primary Examiner*—Erica Cadugan
(74) *Attorney, Agent, or Firm*—Larry R. Meenan

(57) ABSTRACT

An apparatus for pneumatically amplifying the force acting upon a lock rod to retain a toolholder within a toolholder receiving member has a spindle extending from the toolholder receiving member and at least two in-line dual acting piston/cylinder modules within a cavity within the bore of the spindle. Each module has a piston within an associated cylinder and wherein the lock rod, through a drawbar, is attached to the piston of each module such that when each module is pressurized, the combined force of all of the pistons is applied to the lock rod. The invention is also directed to a method for achieving this task.

21 Claims, 12 Drawing Sheets

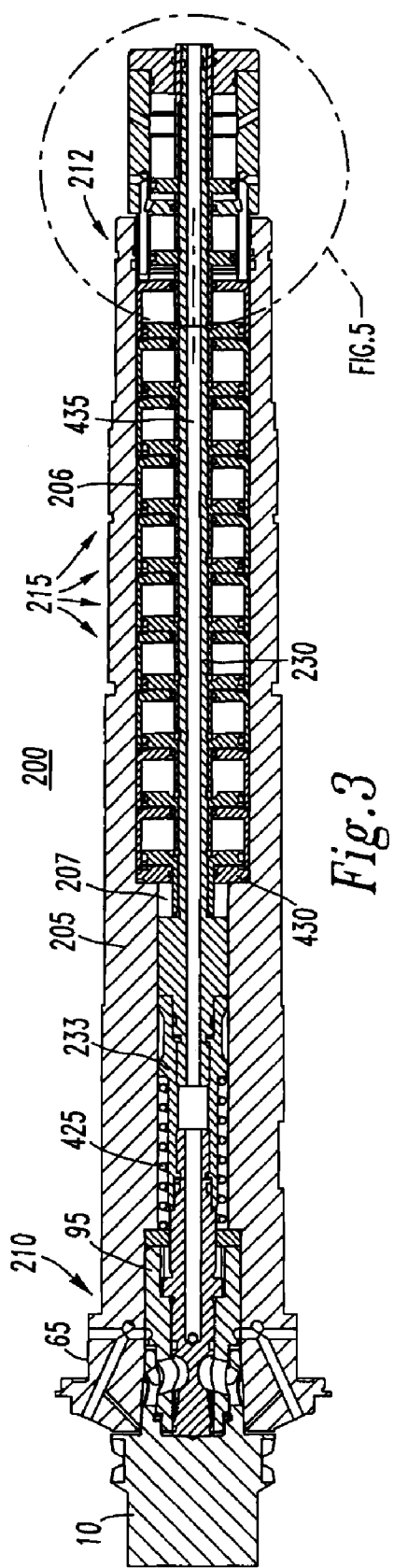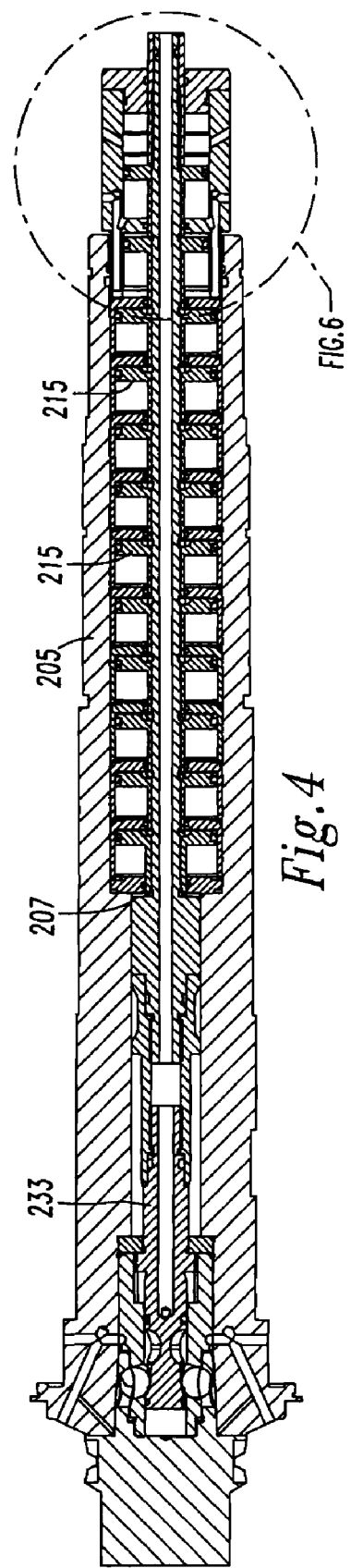

APPARATUS FOR AMPLIFYING THE PULL BACK FORCE ON A LOCK ROD USED TO SECURE A TOOLHOLDER

BACKGROUND OF THE INVENTION

1. Field of the Invention

The present invention relates to an apparatus for pneumatically operating the travel of a lock rod used to secure a toolholder within a toolholder receiving member. More specifically, the invention relates to utilizing a plurality of inline cylinder/piston modules to amplify the force acting upon a lock rod within the limited envelope of the spindle.

2. Description of Related Art

Clamping mechanisms for detachably connecting a toolholder to a toolholder receiving member are well known in the prior art. Such mechanisms are typically used in machining operations where the toolholder holds a cutting insert that is moved into and out of cutting engagement with a workpiece. Such an arrangement allows different toolholders holding different cutting inserts to be quickly attached to and detached from the toolholder receiving member, which in turn is connected to a device for rotating the toolholder. The present invention is intended to be utilized with a rotating toolholder and a stationary workpiece.

One commercial clamping mechanism includes a cylindrically-shaped canister member that is mateable within the tubular end of a toolholder which includes apertures for locking elements into locking engagement with recesses present in the toolholder. The locking elements, which are typically spherical, are radially moved through the apertures in a canister member by means of a reciprocating lock rod having cams that engage the locking elements. Examples of such locking mechanisms are disclosed in U.S. Pat. Nos. 4,708,040; 4,747,735; 4,836,068; and 4,932,295, each of which is assigned or co-assigned to the assignee of the present application and for which each is hereby incorporated by reference.

Looking at FIG. 1, on a toolholder 10 having a forward end 15, a cutting insert 20 is mounted. The cutting insert 20 is spaced from the toolholder 10 by a shim 25, and both the cutting insert 20 and shim 25 are held to the toolholder by means such as a clamp 30, which is secured to the toolholder 10 by a pin 35. The toolholder 10 has a rearwardly facing abutment face 40 along with a tubular shank 45 extending rearwardly from the forward end 15 and has a shank wall 50. The toolholder 10 may have a slot 53 within the shank wall 50 and spaced perforations 55 in the shank wall 50. The toolholder 10 may have forwardly facing concave contact surfaces 60 within the perforations 55. The toolholder 10 is positioned about a longitudinal axis.

A toolholder receiving member 65, having a forwardly facing abutment face 67 and an opening 70 along the longitudinal axis 56, is secured to a base member 75.

The base member 75 may be any of a large variety of anchors to which toolholders may be attached. One such example is the spindle of a rotating tool.

Within a cylindrical passageway 80 in the base member 75 is a stub 85, which also extends into the opening 70 of the toolholder receiving member 65. A bore 90 extends longitudinally through the stub 85 and a lock rod 95 is slidably mounted within the bore 90.

Toward the forward end 97 of the lock rod 95 are depressions 100 in the lock rod 95, which may be aligned with radial apertures 105 extending through the stub 85. The lock rod 95 may be moved along the longitudinal axis 56 by pulling or pushing on the lock rod base 110, which is attached to the lock rod 95. Locking elements 115 positioned within the apertures 105 of the stub 85 and within the depressions 100 of the lock rod 95 may be urged radially outwardly by moving the lock rod 95 away from the toolholder 10.

FIG. 1 shows the toolholder 10 removed from the toolholder receiving member 65. In order to secure the toolholder 10 within the toolholder receiving member 65, the lock rod 95 is positioned such that the locking elements 115 are within the depressions 100 and, furthermore, recessed within the radial apertures 105, such that the tubular shank 45 of the toolholder 10 may be inserted into the opening 70.

As shown in FIG. 2, with the toolholder 10 positioned within the opening 70, the lock rod 95 may be pulled in the direction of arrow 117 away from the toolholder 10 such that the locking elements 115 are displaced radially outwardly by cam surfaces 116 of the depressions 100 and the locking elements 115 penetrate the perforations 55, such that they contact the forwardly facing concave contact surfaces 60. When the lock rod 95 is retracted in the direction of arrow 117, the toolholder 10 is urged within the toolholder receiving member 65 and the rearwardly facing abutment face 40 of the toolholder 10 contacts the forwardly facing abutment surface 67 of the toolholder receiving member 65. This action of the lock rod 95 secures the toolholder 10 within the toolholder receiving member 65.

It should be noted in FIG. 2, that the locking elements 115 are protruding beyond the radial aperture 105 and urging the tubular shank wall 50 against the walls of the opening 70. For increased stiffness between the toolholder 10 and the toolholder receiving member 65, the lock rod 95 may be retracted further thereby causing the locking elements 115 to elastically deform a portion of the shank 45 until it contacts the walls of opening 70.

In order to provide still higher stiffness between the toolholder 10 and the toolholder receiving member 65, the tubular shank 45 may be sized relative to the opening 70 such that upon insertion of the toolholder 10 into the opening 70, there exists an interference fit and elastic deflection occurs between the shank 45 and the toolholder receiving member 65 in the vicinity of the opening 70. In such a manner the toolholder 10 may be secured to the toolholder support member 65 with a high level of accuracy and repeatability.

In order to release the toolholder 10 from the toolholder receiving member 65, the lock rod 95 is urged toward the toolholder 10 in the direction of arrow 119. In such a manner, the locking elements 115 are retracted within the radial aperture 105 and adequate clearance is provided so that the toolholder 10 may be removed from the toolholder receiving member 65.

However, given elastic deformation between the shank 45 of the toolholder 10 and the toolholder receiving member 65, there may exist high frictional forces retaining the toolholder 10 within the toolholder receiving member 65. To release the toolholder 10, the lock rod 95 is extended at the forward end of the toolholder receiving member 65 such that the lock rod 95 protrudes beyond the stub 80 and contacts an impact area 120 within the tubular shank 45 of the toolholder 10. In such a manner, continued urging of the lock rod 95 toward the toolholder 10 will force the lock rod 95 against the impact area 120 thereby ejecting the toolholder 10 from the toolholder receiving member 65.

It should now be appreciated that by urging the locking rod, a toolholder may be secured or released within a toolholder receiving member and, as such, the device shown in FIGS. 1 and 2 provides for quick changing of a toolholder.

It should further be appreciated that the forward end 15 of the toolholder 10 is not limited to the configurations shown in FIGS. 1 and 2, and may be adapted for any number of applications. For this reason, the forward end of a toolholder similar to toolholder 10 may have a large variety of configurations to provide an entire series of toolholders 10, each with a different purpose.

U.S. Pat. No. 5,870,935 is directed to a self-locking clamping apparatus for coupling a tool unit to a tool supporter, which patent is assigned to the present assignee and, furthermore, which patent is hereby incorporated by reference. The focus of this patent is to alter the angle of the ramp on the lock rod so that the ramp angle in conjunction with the locking ball in the lock rod retracted position is self-sticking. As a result of this design, the pullback force may be significantly reduced and, therefore, an object of the subject invention is to exploit this advantage with further features.

Additionally, in some instances especially for rotating applications, the envelope for the toolholder receiving member may be limited in width but may not be limited in length. Therefore, another object of the subject invention is to provide an apparatus that can provide a significant pull back and release force to the lock rod under these circumstances.

SUMMARY OF THE INVENTION

One embodiment of the subject invention is directed to an apparatus for pneumatically amplifying the force acting upon a lock rod to retain a rotatable toolholder within a toolholder receiving member. The apparatus is comprised of a spindle extending from the toolholder receiving member, wherein the spindle has a bore extending therethrough from a first end at the toolholder receiving member to an opposing second end. The apparatus also has at least two inline dual acting piston/cylinder modules within the bore of the spindle, wherein each module is comprised of a piston within an associated cylinder. Additionally, a drawbar, attached to the lock rod, is attached to the piston of each module such that when each module is activated, the combined force of all of the pistons is applied to the lock rod.

Another embodiment of the subject invention is directed an apparatus for pneumatically amplifying the force acting upon a lock rod to retain a rotatable toolholder within a toolholder receiving member. The apparatus is comprised of a spindle extending from the toolholder receiving member, wherein the spindle has a bore extending therethrough from a first end at the toolholder receiving member to an opposing second end. A distributor is secured to the spindle and has at least one dual acting pneumatic piston/cylinder within the bore of the distributor spindle. The at least one piston/cylinder is comprised of a piston within an associated cylinder. A drawbar, attached to the lock rod, is attached to the piston such that when each module is activated, the force of the at least one piston is applied to the lock rod.

Yet another embodiment of the subject invention is directed to a method for pneumatically positioning the lock rod of a system by which a toolholder is secured to a toolholder receiving member through the motion of a lock rod moving within the bore of a spindle. The method is comprised of the steps of installing pneumatically activated dual acting pistons within the bore of the spindle, wherein the pistons are attached to a drawbar, which is attached to the lock rod, and then providing pressurized air to the pistons to move the lock rod in a first direction or in a second direction.

BRIEF DESCRIPTION OF THE DRAWING(S)

The foregoing and other aspects of the present invention will become more apparent upon review of the following detailed description of the invention in conjunction with the drawings which are briefly described below.

FIG. 3 is a sectional side view of an apparatus in accordance with the subject invention with the lock rod in the forward most position and the toolholder able to be released.

FIG. 4 is a sectional side view of the apparatus illustrated in FIG. 3 with the lock rod in the retracted position such that the toolholder is retained within the toolholder receiving member.

DETAILED DESCRIPTION OF THE INVENTION

Figure 1:
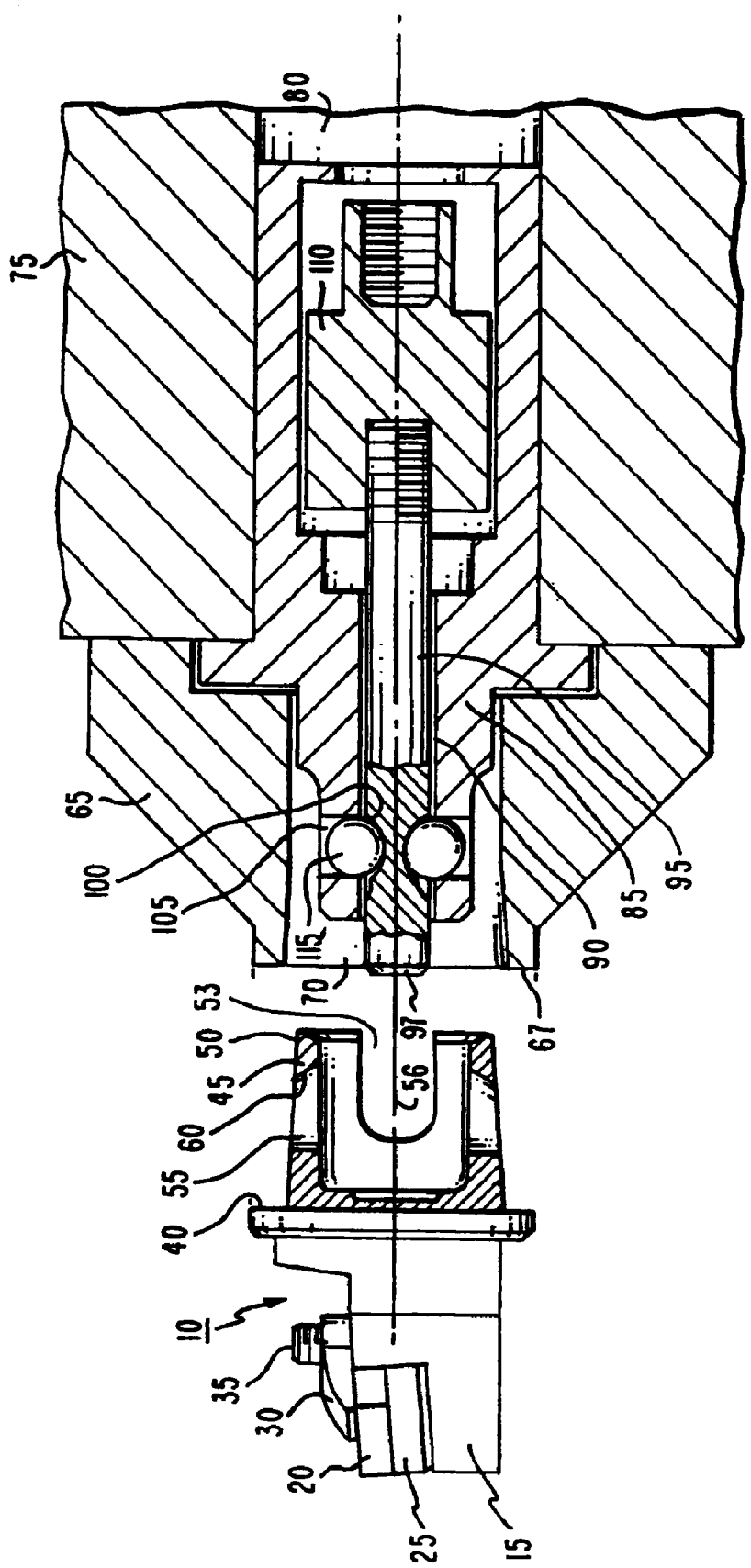
FIG. 1 is prior art and shows a sectional side view of a commercially available quick-change mechanism with the toolholder removed.
Figure 2:
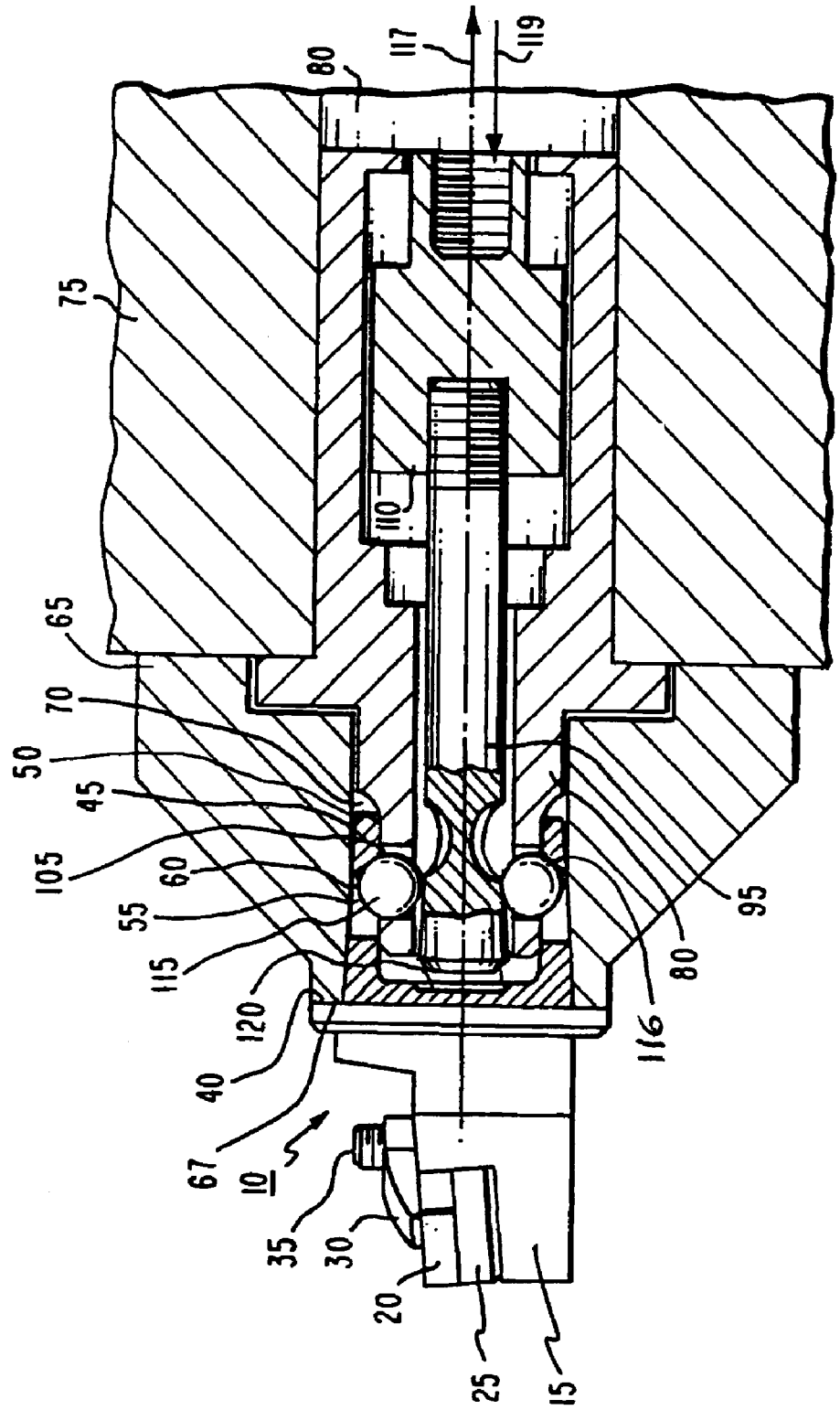
FIG. 2 is prior art and shows the quick-change mechanism of FIG. 1 with the toolholder mounted within the toolholder receiving member.

FIG. 3 is directed to an apparatus 200 for pneumatically amplifying the force acting upon the lock rod 95 to retain a rotatable toolholder 10 within a toolholder receiving member 65. The toolholder 10 in FIGS. 3 and 4 is shown as a blank capable of being machined into any of a number of different configurations, such as that configuration illustrated in FIGS. 1 and 2. The apparatus 200 includes a spindle 205 extending from the toolholder receiving member 65. The spindle 205 has a bore 207 extending therethrough from a first end 210 at the toolholder receiving member 65 to an opposing second end 212. A plurality of inline dual acting cylinder/piston modules 215 are positioned within a cavity 206 in the bore 207 of the spindle 205. As better illustrated in FIG. 5, each module 215 is comprised of a piston 220 with an associated cylinder 225. A drawbar 230 is secured to the piston 220 of each module 215 such that when each module 215 is activated, the combined force of all the pistons 220 is applied to the drawbar 230. The pistons 220 may be slid over the drawbar 230 and secured together at each end of the drawbar 230. The lock rod 95 is secured to the drawbar 230 through a connector 233.

Figure 5:
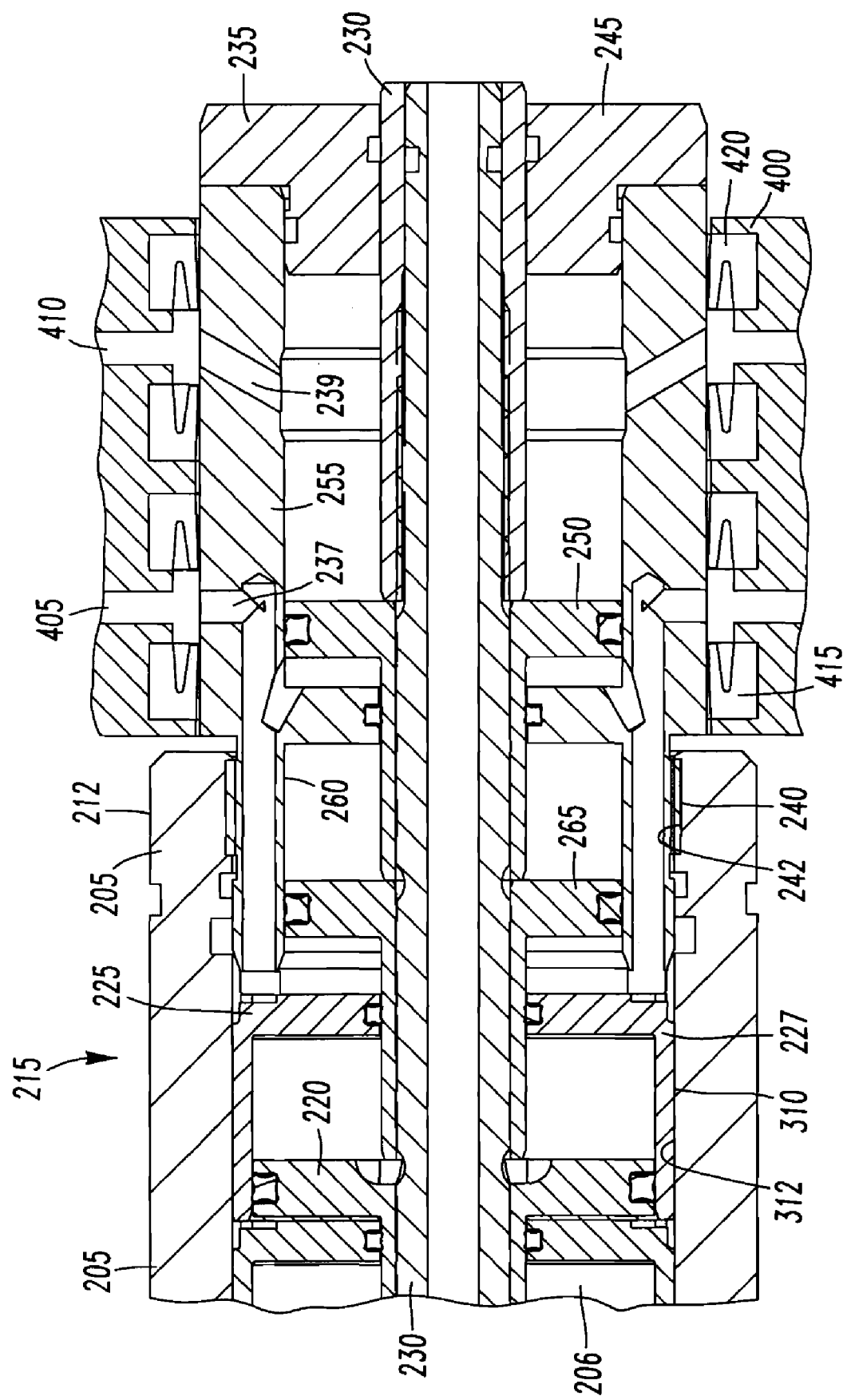
FIG. 5 is an enlarged view of the segment encircled in FIG. 3 and labeled 5 but with a sleeve added to the distributor.

As illustrated in FIG. 5, attached to the second end 212 of the spindle 205 is a distributor 235 for distributing air to the modules 215. Two air inlet ports 237, 239 extend through the distributor 235 and are in fluid communication with the pistons 220. The distributor 235, as illustrated in FIG. 5, has a threaded end 240 which engages a mateable threaded end 242 within the second end 212 of the spindle 205.

Figure 6:
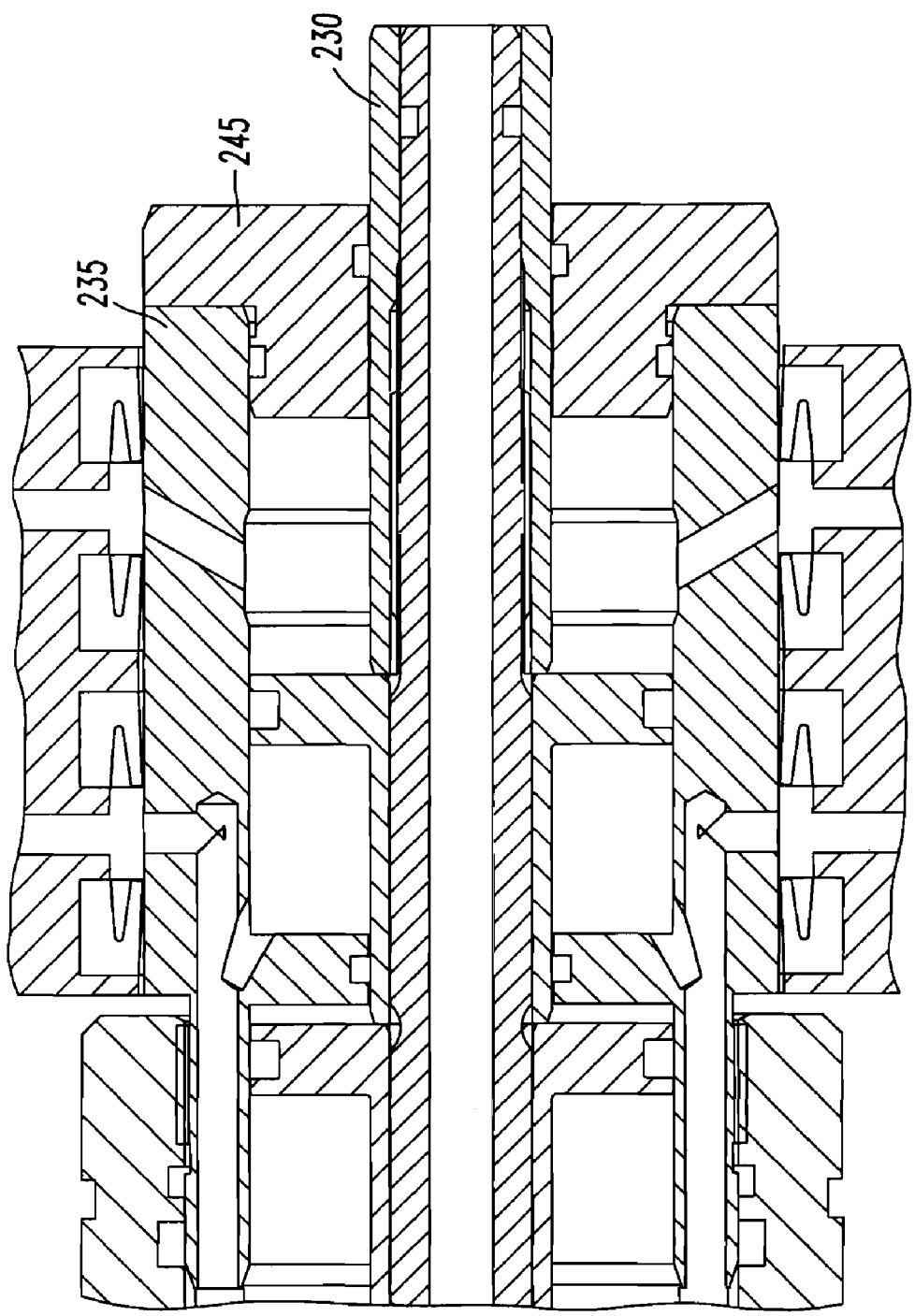
FIG. 6 is an enlarged view of the encircled portion of FIG. 4 labeled 6 but with a sleeve added to the distributor.

A comparison of FIGS. 3 and 4, along with the respective enlargements of a portion thereof found in FIGS. 5 and 6, respectively, shows the relative position of the piston 220 with the drawbar 230 in the release position and the position of the piston 220 with the drawbar 230 in the locked position. It should be appreciated that the only elements that move will be the pistons 220 and the drawbar 230 to which they are attached. The drawbar 230 is secured within the distributor 235 through an end cap 245 which is bolted (not shown) to the end of the distributor 235.

FIGS. 5 and 6 illustrate that in addition to cylinder/piston modules 215 mounted within the spindle 205, the distributor 235 also includes an internal piston 250 within a cylinder 255 within a bore 257 of the distributor 235. This internal piston 250 is also attached to the drawbar 230 to supplement the force provided by the modules 215.

As illustrated in FIGS. 5 and 6, the distributor 235 also provides a second cylinder 260 through which a second internal piston 265 is provided, wherein the second internal piston 265 is also secured to the drawbar 230. As a result, even though the primary purpose of the distributor 235 is to distribute air to the modules 215, as an added benefit, the distributor 235 also houses the first internal piston 250 and the second internal piston 265 such that the pressurized air supplied to the apparatus 200 may activate these pistons 250, 265 to generate an additional force that may be applied to the drawbar 230.

Figure 7:
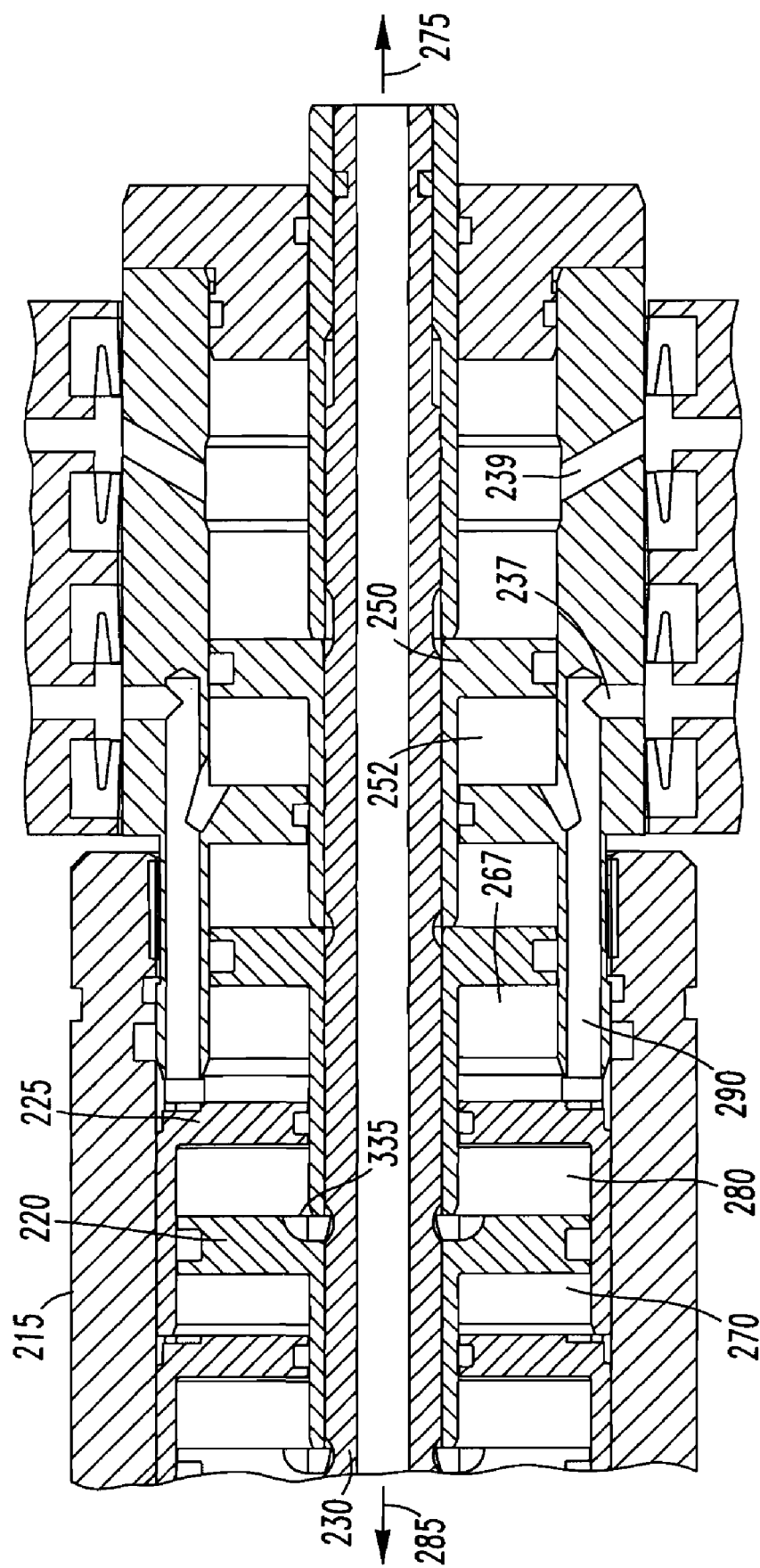
FIG. 7 is an enlarged view similar to that found in FIGS. 5 and 6, however, with the pistons located midway between the released and locked position.

Directing attention to FIG. 7, the drawbar 230 and the pistons 220 are illustrated in a position midway between the release position of FIG. 5 and the locking position of FIG. 6. This figure illustrates a single module 215, with the understanding that the remaining modules are identical, having a first chamber 270, which when pressurized moves the associated piston 220 with the attached drawbar 230 in a first direction 275 and a second chamber 280, which when pressurized moves the associated piston 220 with the attached drawbar 230 in an opposite second direction 285.

Figure 8:
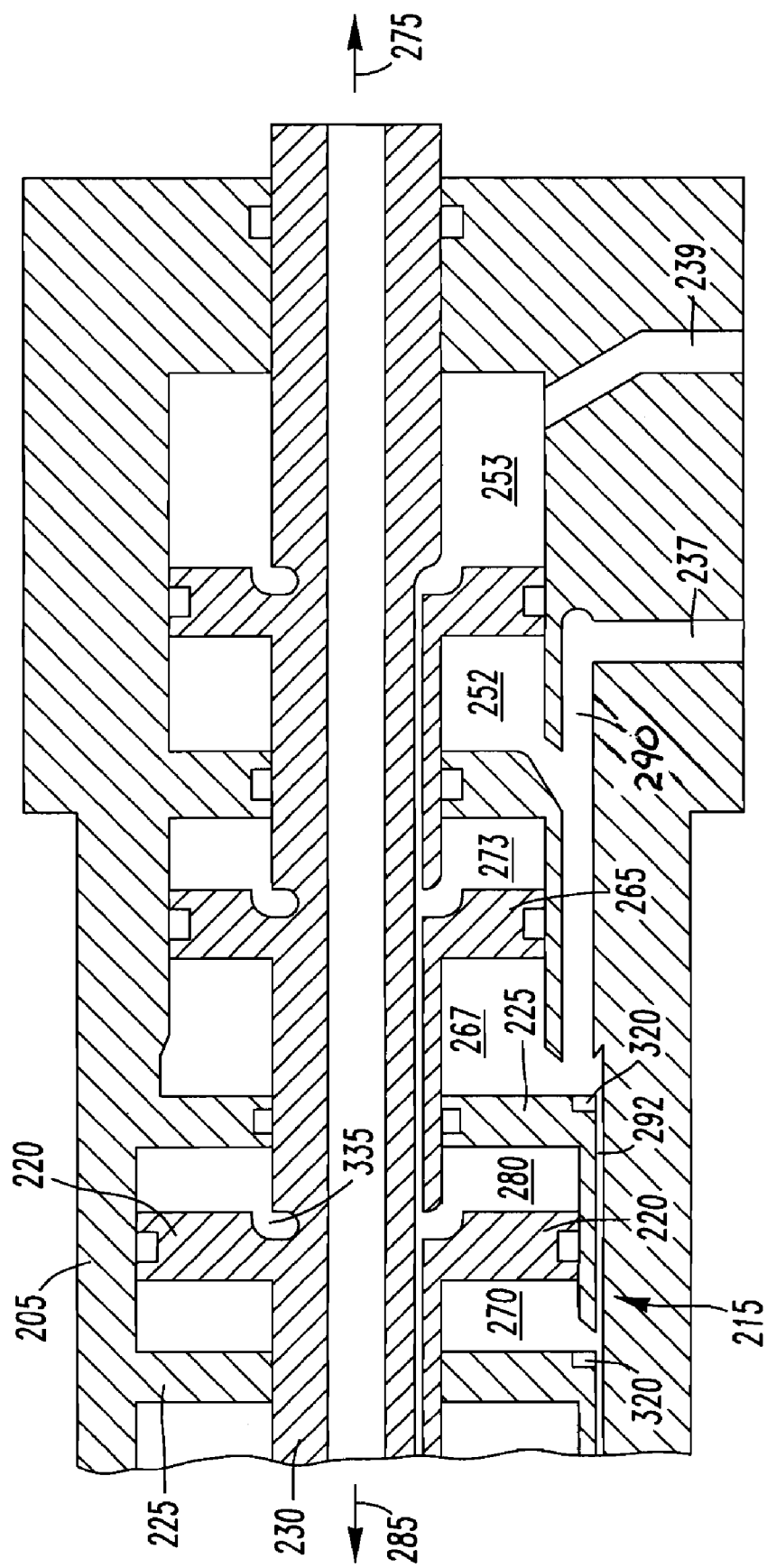
FIG. 8 is a simplified sketch of FIG. 7 illustrating the flow path of the air to activate the pistons.

FIG. 8 illustrates a simplified sketch of FIG. 7 highlighting the fluid communication channels which permit air to travel from the air inlet ports 237, 239 to the chambers 270, 280 associated with the modules 215 and the chambers associated with the distributor 235.

The cross-hatching of the parts in FIG. 8 is intentional and is exaggerated to show the relative motion between the pistons 220 attached to the drawbar 230 relative to the cylinders 225 attached to the spindle 205. FIG. 8 will be discussed with reference to FIG. 7 to appreciate the correlation between the passageways illustrated in FIG. 7 and those illustrated in FIG. 8, with the understanding that there are certain passageways which exist in the apparatus shown in FIG. 7, but as a result of the view, are not visible. Liberties are taken to illustrate these in FIG. 8. The design of these passageways not illustrated in FIG. 7 will be better understood with the subsequent discussion of the part details.

Directing attention to FIG. 8, pressurized air entering air inlet 237 is directed to channel 290 where it is then directed to the first chamber 252 associated with the first internal piston 250. At the same time, air is directed along channel 290 to the first chamber 267 associated with the second internal piston 265. A gap 292, which extends between the cylinder 225 and the spindle 205, permits air to move to a first chamber 270 of module 215 associated with the piston 220.

It should be appreciated that with the first chamber 252 of the first internal piston 250, the first chamber 267 of the second internal piston 265, and the first chamber 270 associated with the piston 220 all pressurized, each of the pistons 250, 265, 220 are urged to the right into the position illustrated in FIG. 5.

What has so far been described is the mechanism by which the drawbar 230 is moved in the direction of arrow 275 to the locked position. What will now be described is the mechanism by which the drawbar 230 is moved to the unlocked or released position in the direction of arrow 285. As illustrated in FIG. 8, pressurized air is introduced within air inlet 239 where it enters a second chamber 253 associated with the first internal piston 250 of the distributor 235. Pressurized air then proceeds along the gap 295 where it enters a second chamber 273 associated with the second internal piston 265. The pressurized air continues down the gap 295 where it then enters the second chamber 280 associated with piston 220. The combined force of the pressurized air acting within the second chambers 253, 273, 280 act upon the respective pistons to urge the pistons and the drawbar 230 attached thereto to the unlocked position in the direction of arrow 285.

Figure 9:
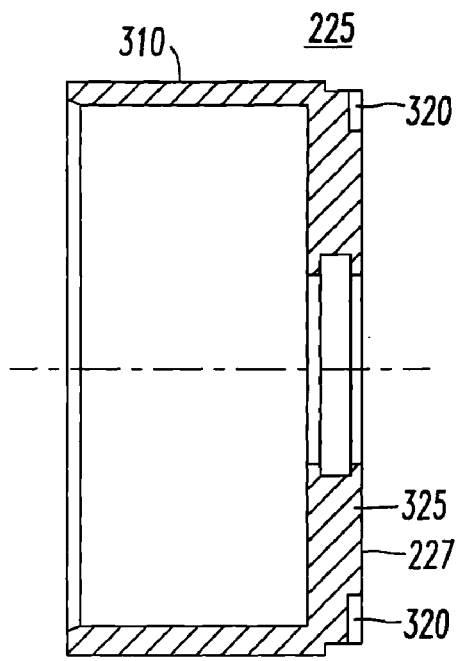
FIG. 9 is a sectional view of a cylinder cup which is placed over the drawbar.
Figure 10:
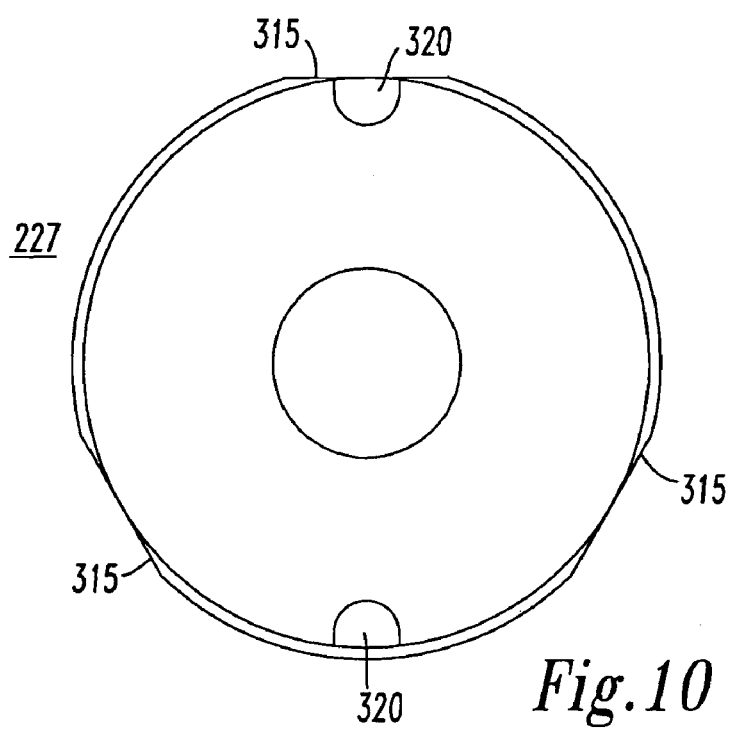
FIG. 10 is an end view of a cylinder cup.
Figure 12:
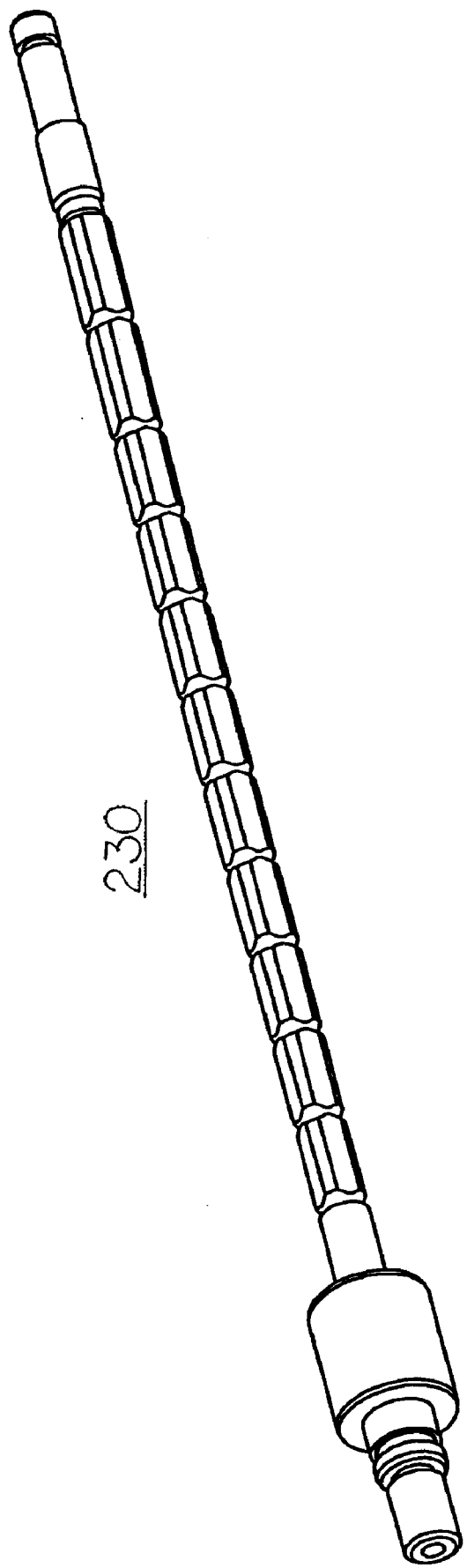
FIG. 12 is a perspective view of a drawbar intended to be secured to the lock rod.
Figure 13:
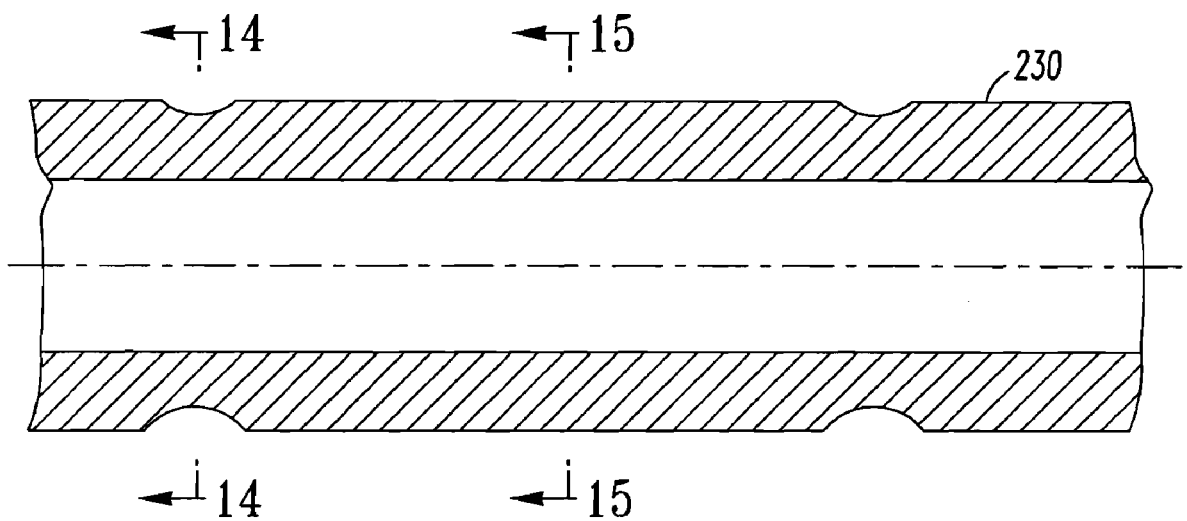
FIG. 13 is a sectional view of a drawbar in accordance with the subject invention.
Figure 14:
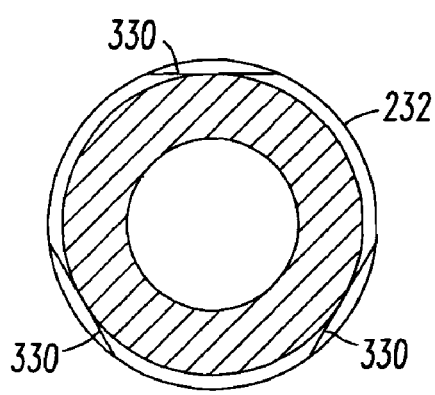
FIG. 14 is a cross-sectional view along arrows 14-14 in FIG. 12.
Figure 15:
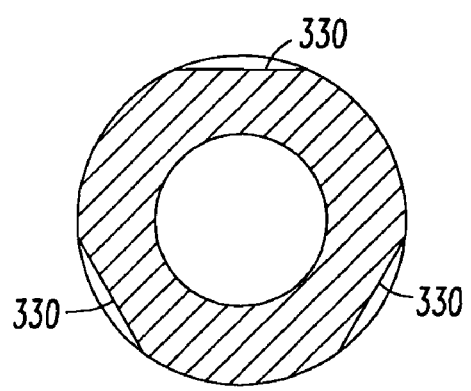
FIG. 15 is a sectional view along arrows 15-15 in FIG. 12.

FIG. 9 illustrates a cross-sectional view of a cylinder 225 in the form of a cylinder cup 227. Directing attention to FIG. 5 and FIG. 9, the cylinder 225 in the form of a cylinder cup 227 has an outer wall 310 which fits within the cavity 206 of the spindle 205 such that the outer wall 310 of the cylinder cup 227 rests against the inner wall 312 of the spindle cavity 206. With reference as illustrated in FIG. 10, the cylinder cup 227 has a generally cylindrically profile but includes three flats 315. Directing attention to FIG. 8, the gap 292 is formed by the void provided by the flat 315 when the piston cylinder 225 is mounted within the cavity 206 of the spindle 205. To permit efficient fluid flow of air through the gap 292 into the first chamber 270, two slots 320 are machined from the face 325 of the cylinder cup 227. While for the module 215 illustrated in FIG. 8, such a slot 320 may not be necessary for the piston cylinder 225 directly adjacent to the distributor 235, this slot 320 is utilized in each of the remaining modules throughout the spindle 205 for the effective transfer of air into the first chamber 270.

Figure 11:
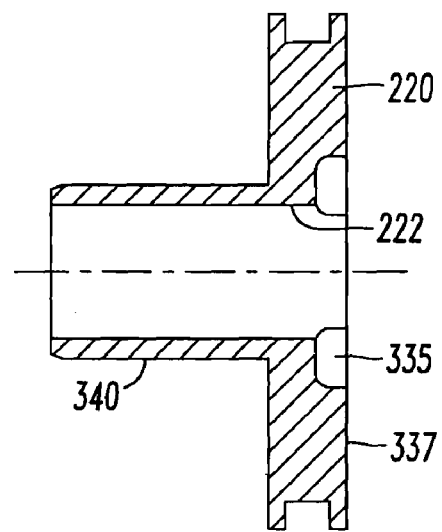
FIG. 11 is a piston which is also placed about the drawbar and positioned within the cylinder cup.

FIG. 11 illustrates a piston 220 which fits within the cylinder cup 227 illustrated in FIG. 9. Both the cylinder cup 227 and the piston 220 surround the drawbar 230. The cylinder cup 227 is immobile within the cavity 206 of the spindle 205, while the piston 220 mounted to the drawbar 230 is movable within the bore 207 of the spindle 205.

Just as the flats 315 on the cylinder cup 227 provided the gap 292 (FIG. 8) for air from air inlet 237 to travel, there is a similar gap between the drawbar 230 and the piston 220. In particular and directing attention to FIGS. 12-15, the drawbar 230 has a generally cylindrically profile 232 which fits within a matching bore 222 (FIG. 11) of the piston 220.

The drawbar 230 has its own set of three flats 330, which, in conjunction with the internal bore 222 of the piston, 220 provide the gap 295 (FIG. 8) through which pressurized air travels through the air inlet 239 to the associated second chambers 253, 273, 280. For rotating applications, the flats 330 are symmetric about the drawbar 230.

Directing attention to FIG. 11, slots 335 are cut within the face 337 of the piston 220 to permit flow from the gap 295 into the respective second chambers 253, 273, 280 of the modules 215. Briefly returning to FIGS. 3 and 4, it can now be better appreciated that the cavity 206 of the spindle 205 is filled with a plurality of cylinder/piston modules 215, wherein the cylinder cups 227 of adjacent modules 215 within the spindle 205 abut each other to position the modules 215 within the spindle 205. In particular, the modules 215 are stacked in series against one another within the spindle 207.

Each piston 220 additionally has a sleeve 340 (FIG. 11) extending therefrom, such that the sleeve 340 of one piston 220 abuts the face 337 of an adjacent piston 220 so that a plurality of pistons are positioned in series over the drawbar 230 and move in unison with the drawbar 230. The gap 295 is defined between the bore 222 of the piston 220 which extends into the sleeve 340 in conjunction with the flats 330 on the drawbar 230. The gaps 292, 295 (FIG. 8) have been produced by the flat 330 on the drawbar 230 (FIG. 14) and a flat 315 on the cylinder cup 227 (FIG. 11). There may be more or less than three flats and these shapes do not have to be flat. The goal is to provide air flow between the air inlet ports 237, 239 and the pistons 220 in each of the modules. Additionally, these flats may be in the mating parts, as opposed to the cylinder cup 227 and drawbar 230 exterior surfaces.

For rotary applications, it is important for the arrangement of gaps to be symmetric about the spindle to provide balance.

Returning to FIGS. 3 and 4, in one embodiment of the subject invention the spindle tool 205 is a standard design such that the cavity 206 available in which to mount the modules 215 is also fixed. In the embodiment disclosed so far, for identical air pressure provided to the air inlet 237 and the air inlet 239, the force acting upon the drawbar 230 urging it to the locked position along arrow 275 (FIG. 7) and the force on the drawbar which releases the toolholder 10 in the direction of arrow 285 are identical. Under certain circumstances, the toolholder 10 and the toolholder receiving member 65 are designed so that once the lock bar 95 is retracted to the locked position along arrow 275, the relationship between the locking elements 115 and the cam surfaces 116 is self-sticking similar to a Morse taper. Under such circumstances, while the force required to position the toolholder 10 in such a self-sticking arrangement may have been relatively low, the force required to release the toolholder 10 from the toolholder receiving member 65 may be significantly greater. As a result, if the greater force required to release the toolholder 10 was applied to secure the toolholder 10 into the toolholder receiving member 65, that force may be excessive and, as a result, may damage the assembly. For that reason, under certain circumstances, the pull-back force in the direction of arrow 275 (FIG. 7) must be substantially less than the release force in the direction of arrow 285 (FIG. 7).

Figure 16:
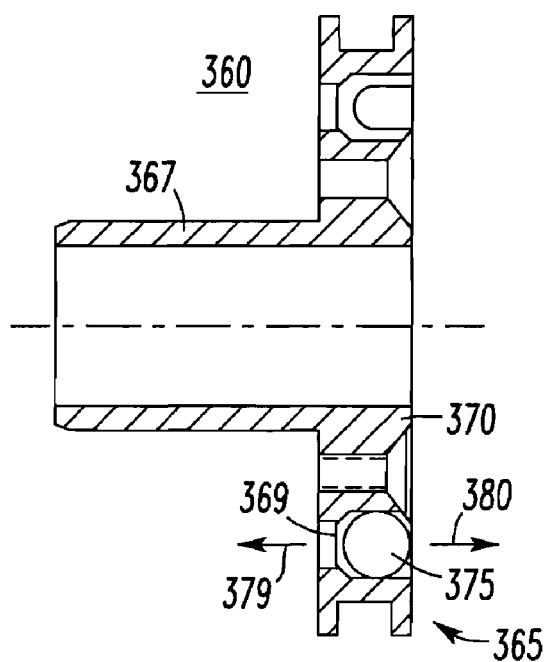
FIG. 16 is a cross-sectional view of a piston with a one-way valve.

Directing attention to FIG. 16, a check valve module 360 includes a one way valve 365 for allowing pressurization of only one of the first chamber or the second chamber in a given module. The check valve module 360 is a piston-like segment 367 with a passageway 369 extending through the face 370. The passageway 369 is machined such that a sphere 375 secured therein by a screw 378 will seal the passageway 369 when moved in the direction indicated by arrow 379 and will permit air to pass therethrough when the sphere 375 is moved in the direction of arrow 380. In such a fashion, only the chamber adjacent to the face 370 may be pressurized. It should be appreciated that the check valve module 360 is comprised not only of the piston-like segment 367 but, furthermore, is comprised of a typical cylinder cup 227 previously discussed herein.

Figure 17:
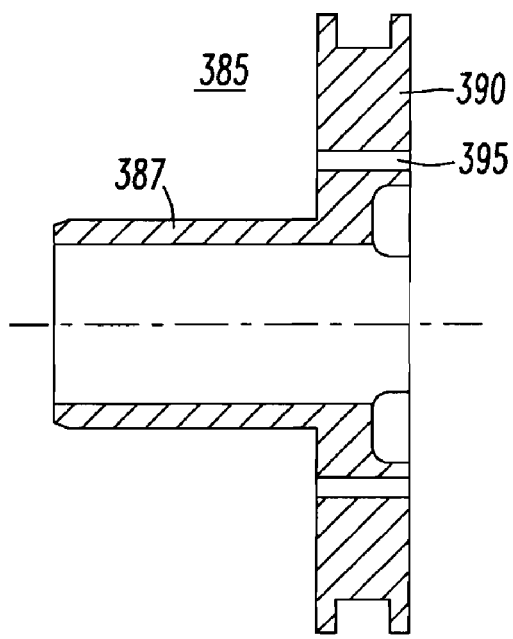
FIG. 17 is a cross-sectional view of a piston with a through hole.

In another instance, utilizing the spindle 205 of a standard size in a fixed-size cavity 206, the force generated by the plurality of modules 215 may be excessive and a user may desire to reduce the overall force produced if all of these modules 215 were actually operative. FIG. 17 illustrates a spacer module 385 comprised of a piston-like segment 387 for filling the remaining space within the fixed-sized cavity of a spindle when a minimum number of active modules 215 are sufficient to generate a desired force on the drawbar 230. In particular, the piston-like segment 387 has a face 390 with passageways 395 extending therethrough. The spacer module 385 is comprised of both the piston-like segment 387 and a cylinder cup 227, previously discussed, to produce a spacer module which may be substituted for a cylinder/piston module. By doing so, the pressure is not permitted to accumulate in either the first chamber or the second chamber of the spacer module and this arrangement permits unrestrained flow fluid between the first chamber and the second chamber.

The toolholder 10 and the associated spindle 205 of the subject invention are designed for rotary applications. Briefly directing attention to FIG. 8, it should be appreciated that air inlet 237 and air inlet 239 must have associated therewith sealed supply lines for transferring pressurized air. Directing attention to FIG. 5, a sleeve 400 surrounds the distributor 235 and has a first chamber supply line 405 associated with the air inlet port 237 and a second chamber supply line 410 associated with the air inlet port 239. It should be appreciated that when the toolholder 10 and the toolholder receiving member 65 have a self-sticking relationship, then once the toolholder 10 is set within the toolholder receiving member 65 no further force is required upon the toolholder 10 to retain the toolholder 10 within the toolholder receiving member 65. For that reason, the sleeve 400 has associated with each chamber supply line 405, 410 lip seals which, when pressure is provided within, for example the first chamber supply line 405, expand against the surface of the distributor 235 to provide a seal between the first chamber supply line 405 and the air inlet 237. When the pressure is relieved, the lip seals 415 move away from the distributor 235 to permit free rotation of the distributor 235. The same relationship exists with respect to lip seals 420 and air inlet port 239. Lip seals are a standard commercially available product and, for that reason, no additional discussion of these will ensue.

The sleeve 400 remains stationary and, as a result, when the toolholder 10 and the toolholder receiving member 65 are utilized in rotating applications, the sleeve 400 may not contact the distributor 235 unless the distributor 235 is no longer rotating.

Although not illustrated, the subject invention may be adapted for use with non-sticking toolholder/toolholder support member arrangements. However, under such circumstances, the manifold must be capable of delivering a sustained pressure to retain the drawbar 230 in the locked position as the distributor 235 continues to rotate. This would be possible through the use of a rotary union (not shown) about the distributor to retain air within the chambers of each module 215 for maintaining the drawbar 230 in the pull-back position.

Briefly returning to FIG. 3, although the embodiment is directed to a self-sticking toolholder, as a precaution a low force safety spring 425 is introduced along the lock rod 95 to urge the lock rod 95 in the pull-back position. It should also be noted with respect to FIG. 3, that a sealing plate 430 must be introduced at the furthermost left portion of the cavity 206 to maintain the pressurized air within the confines of the cavity 206.

Continuing to direct attention to FIG. 3, the drawbar 230 has a central bore 435 extending therethrough for distributing coolant to the toolholder 10.

Figure 18:
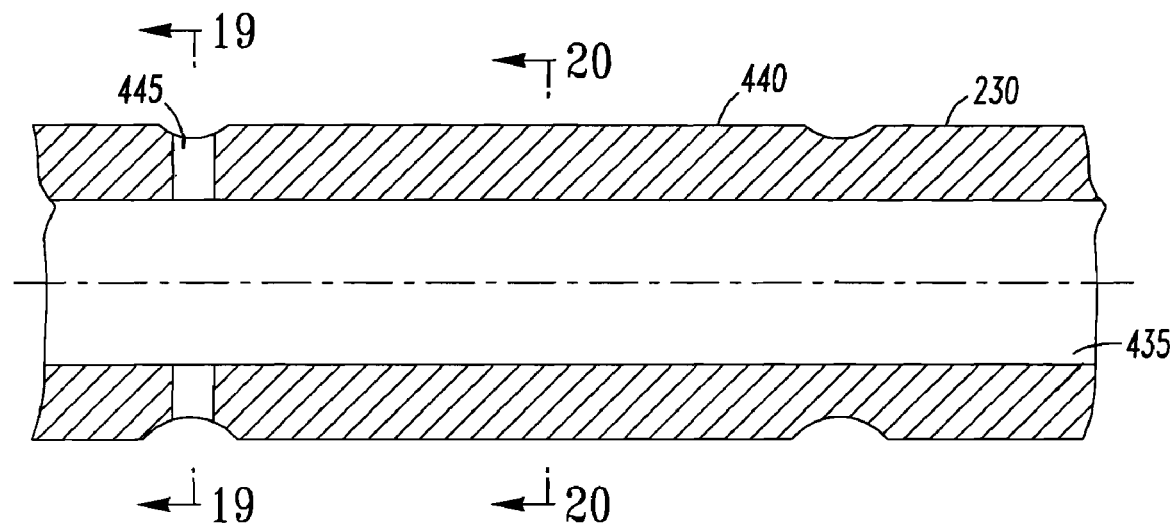
FIG. 18 is a cross-sectional view of a drawbar through which the central bore may be used as a flow channel for providing air to the piston chambers.
Figure 19:
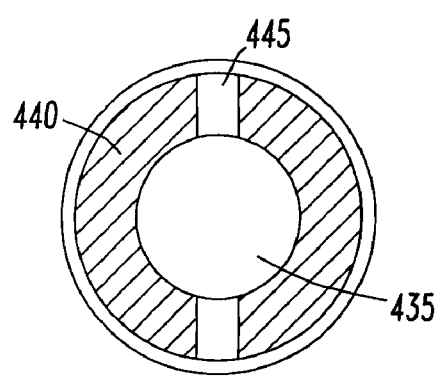
FIG. 19 is a cross-sectional view along arrows 19-19 in FIG. 18.
Figure 20:
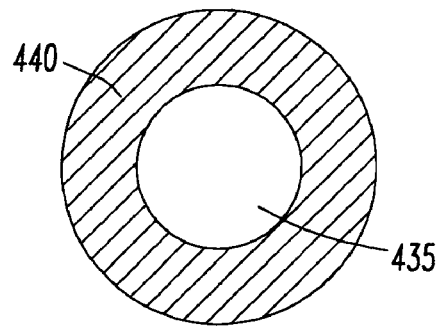
FIG. 20 is a cross-sectional view along arrows 20-20 in FIG. 18.

In the event the central bore 435 of the drawbar 230 is not utilized for coolant, the design of the drawbar 230 may be modified as illustrated in FIGS. 18-20, wherein a modified drawbar 440 has bores 445 extending radially outward such that the gap 295 (FIG. 8) may be eliminated in favor of the bores 445 through the modified drawbar 440.

The subject invention is also directed to a method for pneumatically positioning the drawbar 230 within the bore 207 of a spindle 205 by installing pneumatically activated dual-acting piston modules 215 within a cavity 206 in the bore 207 of the spindle 205 wherein the pistons 220 of these modules 205 are attached to the drawbar 230. Subsequently, air pressure may be provided to the pistons 220 to move the drawbar 230 in a first direction 275 or in a second direction 285.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. An apparatus for pneumatically amplifying the force acting upon a lock rod to retain a toolholder within a toolholder receiving member, wherein the apparatus is comprised of:
   a) a spindle extending from the toolholder receiving member, wherein the spindle has a bore extending therethrough from a first end at the toolholder receiving member to an opposing second end; and
   b) at least two-in-line dual acting piston and cylinder modules within a cavity within the bore of the spindle, wherein each module is comprised of a piston within an associated cylinder and wherein the lock rod is attached to the piston of each module such that when each module is pressurized, the combined force of all of the piston is applied to the lock rod.

2. The apparatus according to claim 1, further including a distributor attached to the second end of the spindle for distributing air to the modules.

3. The apparatus according to claim 2, wherein the distributor further includes an internal piston with a cylinder, the piston being in a bore of the distributor, wherein the internal piston is attached to the lock rod to supplement the force provided by the modules.

4. The apparatus according to claim 2, further including a sleeve about the distributor wherein the sleeve has a first chamber supply line and a second chamber supply line and wherein the sleeve includes a lip seal about each of the supply lines to provide a seal against the distributor when pressure is supplied in the supply lines and to move away from the distributor when no pressure is supplied to the supply lines.

5. The apparatus according to claim 4, wherein each module has a cylinder cup secured within the spindle and the associated piston movable within the cylinder cup.

6. The apparatus according to claim 5, wherein the cylinder cups of adjacent modules within the spindle abut each other to position the modules within the spindle.

7. The apparatus according to claim 6, wherein the modules are stacked in series against one another within the spindle.

8. The apparatus according to claim 5, wherein the cylinder cup of each module fits against the bore within the spindle and there is a gap between an outer surface of the respective cylinder cup and an inner surface of the bore to permit fluid communication between the distributor and a second chamber of each of the modules.

9. The apparatus according to claim 8, wherein each of the cylinder cups are generally cylindrical and the gap thereof is a recess within and along the length of the outer cylindrical surface of the respective cylinder cup.

10. The apparatus according to claim 4, wherein the piston of each module includes a sleeve which fits over a drawbar connected to the lock rod and there is a gap between the outer surface of the drawbar and the inner surface of the piston sleeve to permit fluid communication between the distributor and a first chamber of each of the modules.

11. The apparatus according to claim 10, wherein the drawbar is generally cylindrical and the gap is a recess within and along the length of a cylindrical surface of the drawbar.

12. The apparatus according to claim 4, wherein the piston of each module includes a sleeve and fits over a drawbar having a longitudinal axis and connected to the lock rod and there is a radially extending bore extending from a central bore within the drawbar through the sleeve of each module to provide fluid communication between the central bore and a first chamber of a respective module for pressurizing the first chamber of the modules.

13. The apparatus according to claim 2, further including an actuatable pressure seal about the distributor to retain air within chambers of each module for maintaining the lock rod in a pull back position.

14. The apparatus according to claim 1, wherein each module has a first chamber which when pressurized moves the associated piston with the attached lock rod in a first direction and has a second chamber which when pressurized moves the associated piston with the attached lock rod in an opposite second direction.

15. The apparatus according to claim 1, further including a check valve module with a one-way valve therein for allowing pressurization of only one of a first chamber or a second chamber of the modules.

16. The apparatus according to claim 15, wherein the check valve module is comprised of a cylinder cup with a piston therein, wherein the piston of the check valve module has a head with at least one passageway extending therethrough and a sphere within the at least one passageway which seats and seals the at least one passageway in one direction and permits fluid to pass therethrough in an opposite direction.

17. The apparatus according to claim 1, further including a spacer module for filling the remaining space with the spindle cavity when there are not enough piston and cylinder modules therein to do so, wherein the spacer module permits fluid flow between a first chamber and a second chamber of the spacer module.

18. The apparatus according to claim 17, wherein the spacer module is comprised of a cylinder cup with a piston therein, wherein the piston has a head with at least one passageway extending therethrough to permit unrestrained flow of fluid between the first chamber and the second chamber.

19. The apparatus according to claim 1, further including a safety spring within the spindle bore for assisting the lock rod in a pul back position.

20. The apparatus according to claim 1, wherein the lock rod has a central bore extending therethrough for distributing coolant to the toolholder.

21. An apparatus for pneumatically amplifying the force acting upon a lock rod to retain a rotatable toolholder within a toolholder receiving member, wherein the apparatus is comprised of:
   a) a spindle extending from the toolholder receiving member, wherein the spindle has a bore extending therethrough from a first end at the toolholder receiving member to an opposing second end, and
   b) a distributor secured to the spindle, wherein the distributor has at least one dual acting pneumatic piston within a bore of a cylinder of the distributor; and
   c) at least two in-line dual acting pistons and cylinders within the bore of the spindle, and wherein the lock rod is attached to the at least two pistons such that when each of the at least two pistons and cylinders is activated, the force of the at least two pistons is applied to the lock rod.

* * * * *